(12) United States Patent
Bretschneider

(10) Patent No.: US 7,570,006 B2
(45) Date of Patent: Aug. 4, 2009

(54) METHOD AND MEANS FOR USING A CONTROL FILE WITH A CONTROL UNIT OF A MACHINE

(75) Inventor: Jochen Bretschneider, Esslingen (DE)

(73) Assignee: Siemens Aktiengesellschaft, München (DE)

( * ) Notice: Subject to any disclaimer, the term of this patent is extended or adjusted under 35 U.S.C. 154(b) by 287 days.

(21) Appl. No.: 11/569,013

(22) PCT Filed: May 12, 2005

(86) PCT No.: PCT/EP2005/052174

§ 371 (c)(1),
(2), (4) Date: Nov. 13, 2006

(87) PCT Pub. No.: WO2005/111745

PCT Pub. Date: Nov. 24, 2005

(65) Prior Publication Data

US 2007/0225834 A1    Sep. 27, 2007

(30) Foreign Application Priority Data

May 13, 2004    (DE) ................ 10 2004 023 848

(51) Int. Cl.
*G05B 19/18* (2006.01)
(52) U.S. Cl. ............. 318/569; 318/568.16; 318/568.17; 318/600; 700/23; 700/69; 700/96; 701/35; 707/200
(58) Field of Classification Search ............ 700/23, 700/159, 69, 96, 169; 318/569, 560, 568.16, 318/568.17, 600
See application file for complete search history.

(56) References Cited

U.S. PATENT DOCUMENTS 3,882,304 A * 5/1975 Walters ................. 700/163

(Continued)

FOREIGN PATENT DOCUMENTS

DE    40 41 869    7/1992

(Continued)

OTHER PUBLICATIONS

G. Zhiming et al: "Development of PC-based adaptive CNC control system", 2001, Sichapore Institute of Manufacturing Technology, Singapore, XP002338388.

(Continued)

*Primary Examiner*—Bentsu Ro
*Assistant Examiner*—Antony M Paul
(74) *Attorney, Agent, or Firm*—Henry M. Feiereisen; Ursula B. Day

(57) ABSTRACT

A computer (20) that determines a sequence of control vectors (16) using predetermined functional instructions. Each vector includes a number of vector elements (17). Each vector element (17) is designed for a maximum of one final drive unit (2 to 4) of a machine (1). Each control vector (16) comprises at least one vector element (17) for each final drive unit (2 to 4) of the machine (1). There is at least one positioning element (s*) for each final drive unit (2 to 4). The computer (20) stores the determined sequence of control vectors (16) as a control file (11). Once the file has been transmitted to a control unit (6) of the machine (1), the control unit retrieves the control file (11) and executes the stored sequence of control vectors (16). The control unit staggers the execution of successive control vectors (16) by a predetermined clock interval (delta t). The control unit also determines the control state of each final drive unit (2 to 4) of the machine (1) for each instant, using the vector elements (17) that have been determined for said final drive unit (2 to 4) and controls the final drive units (2 to 4) correspondingly.

48 Claims, 5 Drawing Sheets

U.S. PATENT DOCUMENTS

| | | | | |
|---|---|---|---|---|
| 4,041,287 A | * | 8/1977 | Kolell et al. | 318/569 |
| 4,449,196 A | * | 5/1984 | Pritchard | 708/670 |
| 4,510,565 A | * | 4/1985 | Dummermuth | 700/7 |
| 5,334,918 A | * | 8/1994 | McMurtry et al. | 318/568.16 |
| 5,406,494 A | * | 4/1995 | Schuett | 700/188 |
| 5,453,933 A | * | 9/1995 | Wright et al. | 700/181 |
| 5,604,677 A | * | 2/1997 | Brien | 700/186 |
| 5,808,888 A | * | 9/1998 | Susnjara et al. | 700/86 |
| 6,022,132 A | * | 2/2000 | Schulz | 700/186 |
| 6,338,003 B1 | * | 1/2002 | Kamiguchi et al. | 700/169 |
| 6,470,225 B1 | * | 10/2002 | Yutkowitz | 700/44 |
| 2005/0085940 A1 | * | 4/2005 | Griggs et al. | 700/181 |

FOREIGN PATENT DOCUMENTS

| | | |
|---|---|---|
| DE | 42 91 619 | 12/1992 |
| DE | 40 11 491 | 3/1994 |
| DE | 101 40 969 | 3/2003 |

OTHER PUBLICATIONS

Xu, X. W. et al: "Striving for a total integration of CAD, CAPP, CAM and CNC" in : Robotics and Computer Integrated Manufacturing, Elsevier Science Publishers, Barking, GB vol. 20, No. 2, Apr. 2004.

* cited by examiner

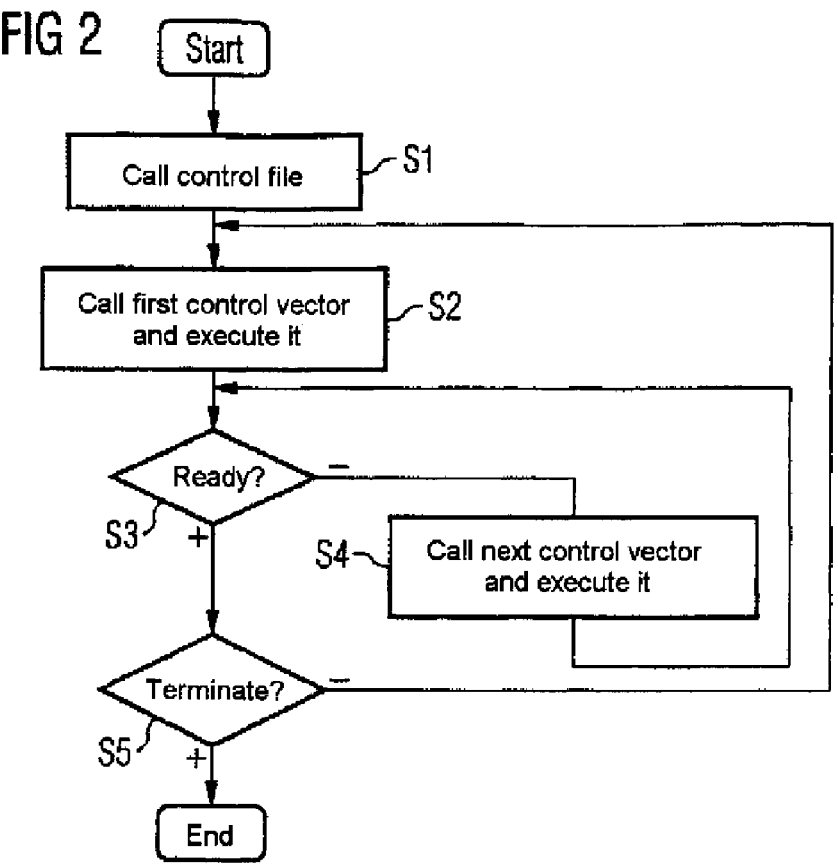
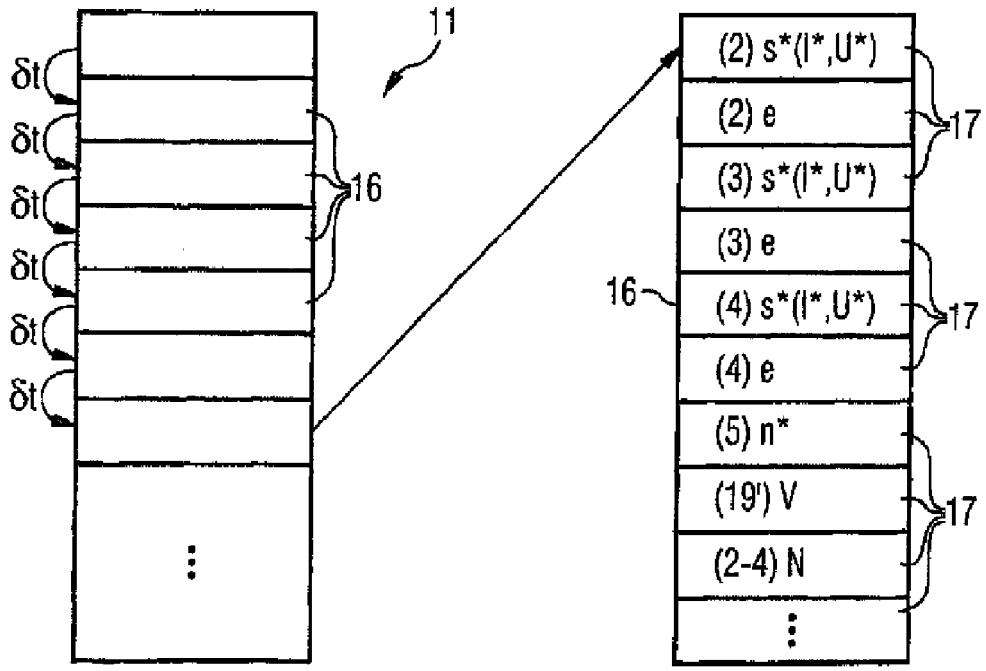

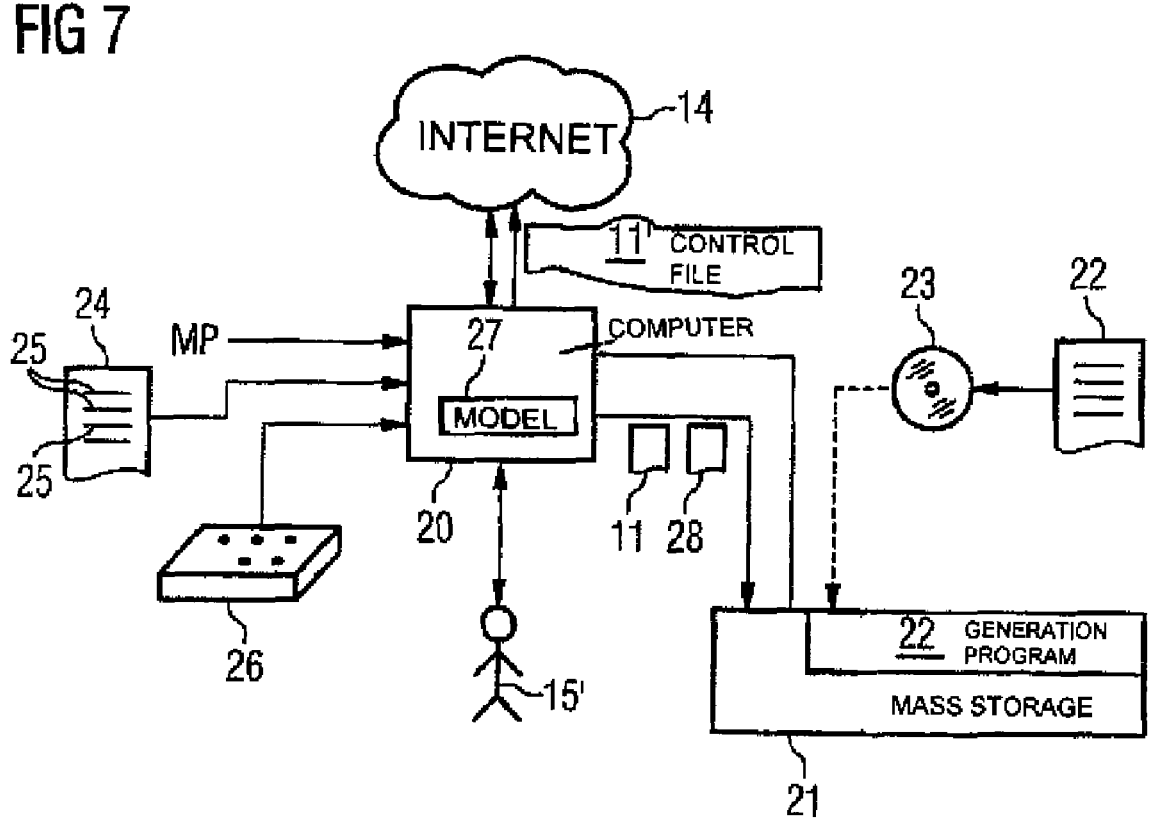

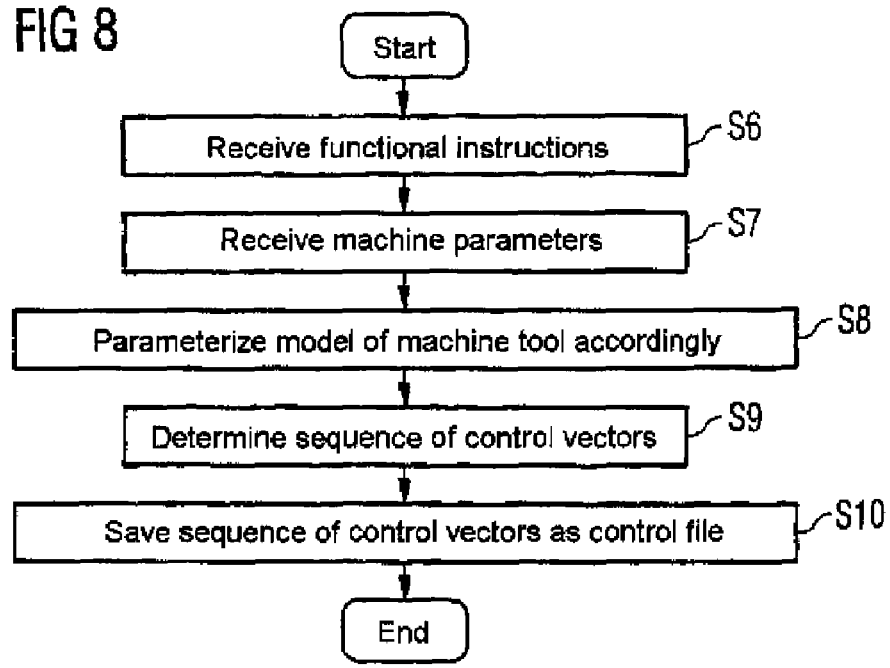
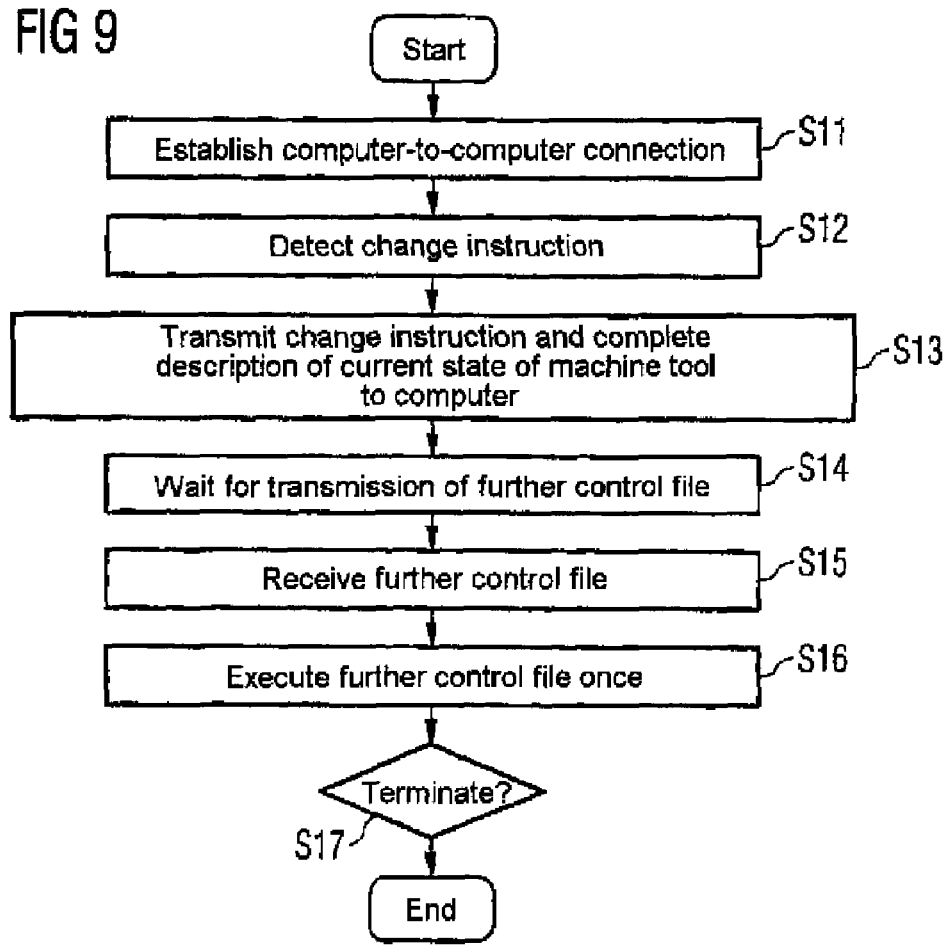

METHOD AND MEANS FOR USING A CONTROL FILE WITH A CONTROL UNIT OF A MACHINE

BACKGROUND OF THE INVENTION

The present invention relates to a generation method for a control file for a control unit for controlling a machine having at least one final drive unit. It furthermore relates to a data carrier having a generation program stored on the data carrier and a computer for executing such a generation method.

The present invention further relates to an operating method for a control unit of a machine having at least one final drive unit. It also relates to a data carrier having an operating program stored on the data carrier and a control unit for executing such an operating method.

Finally, the present invention also relates to a machine having at least one final drive unit and a data carrier having a control file stored on the data carrier.

Machines having at least one final drive unit are generally known. Examples of such machines are machine tools, production machines and manufacturing devices. In the prior art, these machines are controlled by numeric controllers. The numeric controllers execute an application program comprising functional instruction steps, e.g. a part program conforming to DIN 66025. The application program specifies, for example, which machine operations, e.g. which traversing movements, are to be performed.

The numeric controllers have operating software comprising an operating part and a real-time part. The operating part is executed acyclically, that is to say not in real time. The real-time part comprises data preprocessing, path planning, speed control, and possibly also coordinate transformation and/or interpolation. It handles the translation of the instruction steps of the application program into machine-dependent control commands. The real-time part ensures here that this translation is performed in real time.

With this procedure, which as far as the Applicant is aware is employed without exception in the prior art, a computer is therefore present in the numeric controller itself, with a machining to be performed by the machine being specified in functional instructions for the computer. Said computer determines a sequence of control vectors on the basis of the functional instructions. The determination and the execution of the control vectors are coupled to one another here by virtue of the method.

Each control vector has a number of vector elements. Each vector element is determined for a maximum of one final drive unit of the machine. There is at least one vector element for each final drive unit of the machine. The vector elements determined for the final drive unit include at least one positioning setpoint value. The control unit staggers the execution of directly successive control vectors by a specified clock interval. As a result, the control state of each final drive unit of the machine can be determined here by the control unit for each instant on the basis of the vector elements determined for said final drive unit.

The final drive units are then also controlled by the control unit according to the control state determined by said unit. In the prior art, therefore, the control vectors are always determined online by the numeric controller and with a close temporal link to their execution, and are then output to the final drive units. No storage in the form of a control file is performed.

This procedure has many disadvantages. For instance, the computer determining the control vectors can fail. This results in machine downtimes as well as repair costs.

Furthermore, the computer must determine the control vectors in real time, as they are used immediately for controlling the final drive units of the machine. Consequently, the computing performance of the computer must be high, which entails corresponding costs. Or, the clock interval cannot be selected to be short, which may then limit the machining precision of the machine tool.

Also, it is only possible to update the control software of the numeric controller and optimize the functional instructions on site.

SUMMARY OF THE INVENTION

The object of the present invention is to provide a way of avoiding the above-mentioned disadvantages.

In accordance with one aspect of the invention machining to be performed by the machine is specified in functional instructions for a computer.

By executing a generation program, the computer determines a sequence of control vectors on the basis of the functional instructions.

Each control vector has a number of vector elements, and each vector element is determined for a maximum of one final drive unit of the machine.

Each control vector has at least one vector element for each final drive unit of the machine, and the vector elements determined for the final drive unit include at least one positioning setpoint value.

Execution of directly successive control vectors is staggered by the control unit by a specified clock interval.

The computer stores the determined sequence of control vectors as a control file and, for each instant, the control state of each final drive unit of the machine can be determined by the control unit on the basis of the vector elements determined for said final drive unit.

According to another aspect of the invention, in an operating method for a control unit, the control unit calls up a control file by executing an operating program and executes a sequence of control vectors stored in the control file.

Each control vector has a number of vector elements, and is determined for a maximum of one final drive unit of the machine.

Each control vector has at least one vector element for each final drive unit of the machine, and vector elements determined for the final drive unit include at least one positioning setpoint value.

For each instant, the control unit determines the control state of each final drive unit of the machine on the basis of the vector elements determined for said final drive unit and controls the final drive units accordingly.

The control unit staggers the execution of directly successive control vectors by a specified clock interval.

According to another feature of the invention, the control file can be supplied to the control unit either via a computer-to-computer, e.g. the Internet or a LAN (local area network), or a data carrier on which the control file is stored.

Furthermore, the control file can be supplied using a data carrier on which a generation program for executing a generation method of the above-mentioned type or an operating program for executing an operating method of the above-mentioned type or else a control file of the above-mentioned type are stored, respectively.

With respect to the device technology employed, the control file can be supplied by a computer having a mass storage means in which a generation program is stored, so that such a generation method is executed when the generation program is called by the computer. The control file can also be supplied by a control unit for controlling a machine having at least one final drive unit, which has a mass storage means in which an operating program is stored, so that an operating method of the above-mentioned type is executed when the operating program is called by the control unit.

Finally, the according to yet another aspect of the invention, a machine has at least one final drive unit which has a control unit of the above-mentioned type.

With the procedure according to the invention, the determination of the sequence of control vectors by the computer is decoupled from the execution of the control vectors by the control unit. In particular, it is consequently also possible that the computer is not designed as the control unit controlling the machine.

In individual cases, the functional instructions can be specified for the computer in the form of a description of a current machine state and a change instruction. In this case, in particular a so-called jogging mode can be realized for example, as is required during setup and during troubleshooting. Exceptionally, the control file can have only a single control vector here. As a rule, however, the functional instructions are specified for the computer in the form of an application program with instruction steps, e.g. in the form of a CAM file.

The generation method is especially versatile if the computer determines the sequence of control commands on the basis of a parameterizable model of the machine and machine parameters are specified for the computer, on the basis of which the computer parameterizes the model.

The generation method according to the invention is even more versatile if a selection command is specified for the computer, and the computer determines which of a plurality of generation programs it executes depending on the selection command.

It is possible to supply specifications to the computer via a computer-to-computer connection, e.g. the Internet or a LAN. This procedure is particularly advantageous in connection with the above-mentioned jogging mode.

If the computer determines on the basis of the sequence of control vectors an expected machining result, e.g. a data record describing a machined workpiece, and stores it as a result file, in particular it is possible to verify on the computer whether the control vectors determined produce the required machining of the workpiece.

If the computer is supplied with a target machining result, e.g. a CAD file, and the computer optimizes the sequence of control vectors on the basis of a comparison of the expected result with the target result, it is possible in particular to optimize the quality and the dynamics of the actual machining operation. The computer may perform the optimization of the sequence of control vectors here either autonomously or with user assistance.

If stored files are output by the computer via a computer-to-computer connection, e.g. the Internet or a LAN, the files can be forwarded to another location, e.g. to the control unit of the machine, in a particularly simple manner. This procedure is again advantageous in connection with the above-mentioned jogging mode in particular.

The positioning setpoint value may be a position setpoint. It may however also be a setpoint value underlying the position setpoint, e.g. a speed setpoint, current setpoint or voltage setpoint.

The control unit functions even more precisely if the vector elements determined for the final drive unit also include at least one supplementary value, e.g. a time derivation of the positioning setpoint value.

As a rule machines furthermore have at least one further drive unit which is not a final drive unit. For this further drive unit, the control vectors preferably have a vector element that determines at least an ON/OFF state of said further drive unit. It is advantageous here if the vector elements determined for said further drive unit include a setpoint value for a continuously variable value, e.g. a speed setpoint.

If the machine has at least two final drive units, the computer preferably also determines a—possibly control vector-dependent—emergency stop delay and stores it in the control file. It is then also possible to control the final drive units in the event of an emergency stop request in such a way that the braking and stopping of the final drive units follows the same coordination as in normal operation.

If together with the control vectors the computer also determines target state vectors for sensor elements of the machine and assigns them to the control vectors, and also stores the target state vectors together with the control vectors in the control file, it is readily possible to incorporate the functionality of a stored-program controller in the control file. In this case the control unit detects actual states of the machine by means of sensor elements and executes the respective control vector only if the detected actual states of the machine correspond to the assigned target state vector.

The sequence of control vectors stored in the control file is preferably executed only in a base mode. To enable a simple jogging mode, the control unit does not execute said control vectors using an additional mode, but rather instead transmits a description of the current machine state and a change instruction to a computer, then waits until a further control file is transmitted to it by the computer and, once it receives that further control file, finally executes the sequence of control vectors contained in the further control file one time. In particular instances, that further control file may contain only a single control vector. As a rule, however, it also contains a plurality of control vectors. This simple jogging mode can be used even if the control unit can execute only control files of the above-mentioned type, that is to say, even if the control unit is not itself capable of translating functional instructions into a sequence of control vectors.

The clock interval is predetermined in normal operation. It is however possible for it to be specified for the control unit by a user (so-called override). The user may even be able to set the clock interval to infinite here, which corresponds to a machine standstill.

The control unit usually executes the control vectors without any corrections. In order to take account oft for example, tool wear or slight misalignments, in individual cases it may be helpful if the control unit determines for every instant the control state of the final drive units on the basis of the vector elements determined for the respective final drive unit, with additive or multiplicative factoring in of a correction value.

BRIEF DESCRIPTION OF THE DRAWINGS

Further advantages and details will be understood when the description of an exemplary embodiment below is considered in conjunction with the drawings, wherein:

FIG. 2 shows a flowchart,

FIG. 3 shows a control file and a control vector of said control file,

FIG. 7 diagrammatically shows a computer that is not designed as the control unit for controlling a machine, and FIGS. 8 and 9 show flowcharts if a basic mode and a jogging mode, respectively.

DETAILED DESCRIPTION OF PREFERRED EMBODIMENTS

Figure 1:
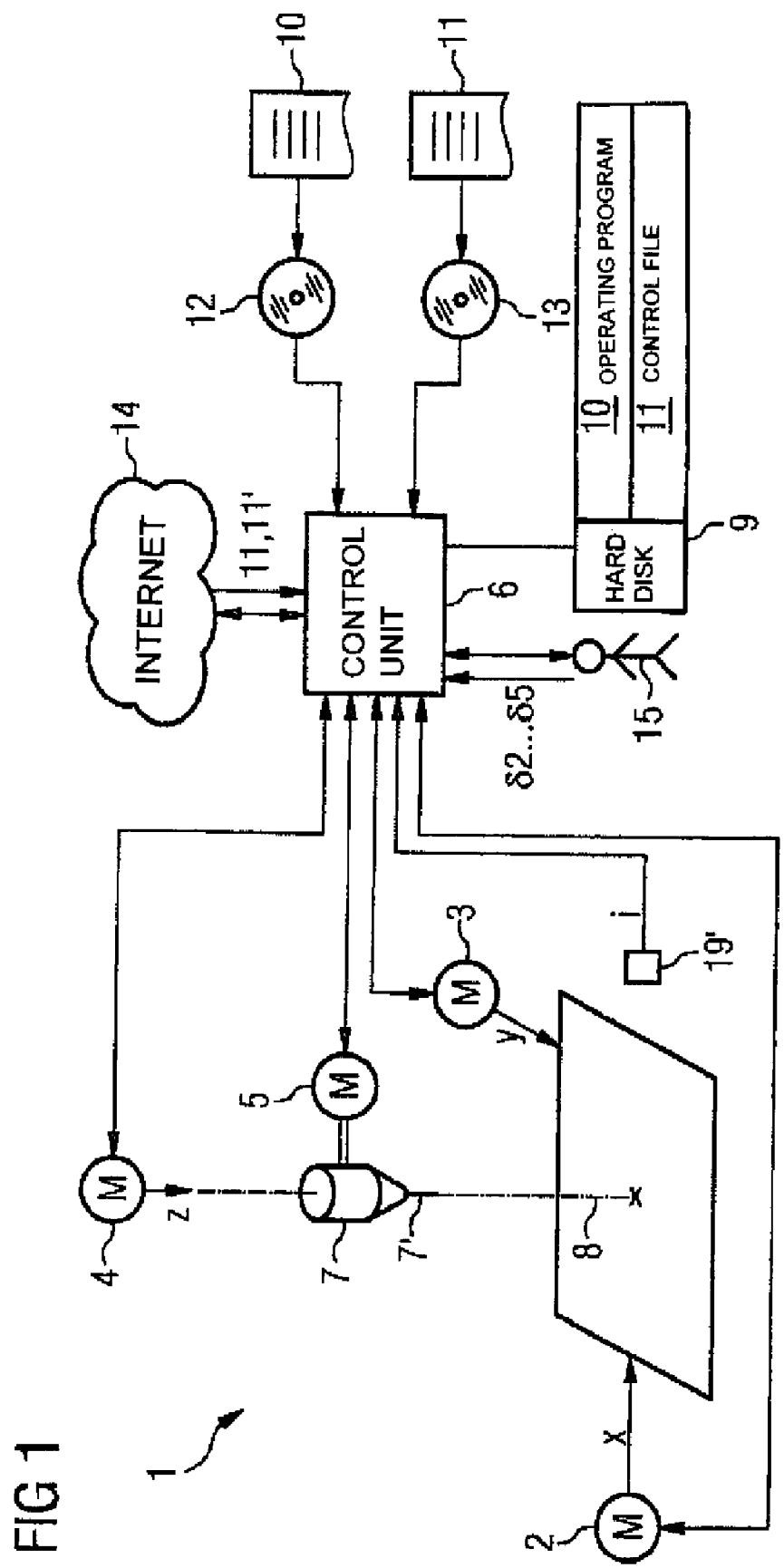
FIG. 1 diagrammatically shows a machine tool.

According to FIG. 1, a machine 1 has a plurality of drive units 2 to 5 and a control unit 6. At least one of the drive units 2 to 5 is a final drive unit, at least one is not a final drive unit. According to the exemplary embodiment of FIG. 1, for example, the drive units 2 to 4 are final drive units, the drive unit 5 is not a final drive unit.

The machine 1 may be any kind of machine. In the following, however, a machine tool 1 is assumed—purely by way of example. The machine 1 could also be another machine, e.g. a production machine that is not a machine tool, or another manufacturing device.

The drive units 2 to 5 have in each case either one or more drives. For the sake of simplicity, therefore, it is assumed in the text below that each drive unit 2 to 5 has only a single drive. The drive units 2 to 5 will thus be referred to below simply as drives 2 to 5 for short.

The control unit 6 in FIG. 1 is also shown as a single unit. It could however also be realized as a distributed control unit. In this case a separate subcontrol unit would be assigned to each drive 2 to 5, which unit could be realized in particular in the drive-internal control unit.

A tool 7, e.g. a drill chuck 7 holding a drill bit 7', can be moved in three mutually perpendicular directions by means of the final drives 2 to 4. The directions are referred to below as x, y and z, and form for example a rectangular, right-handed Cartesian coordinates system. The drill chuck 7 can be rotated about its axis of symmetry 8 by means of the drive 5. The—exemplary—machine tool 1 in FIG. 1 is thus a drill 1.

According to FIG. 1, the control unit 6 has, inter alia, a mass storage means 9, e.g. a hard disk 9. An operating program 10 and a control file 11 are stored in the mass storage means 9. As indicated by dashed lines in FIG. 1, the operating program 10 and the control file 11 can have been previously supplied here to the control unit 6 via data carriers 12, 13 on which the operating program 10 and/or the control file 11 are stored in (exclusively) machine-readable form. Examples of such data carriers 12, 13 are CD-ROMs 12, 13. Alternatively, it is for example also possible to supply the operating program 10 and/or the control file 11 to the control unit 6 in a different way, e.g. via a computer-to-computer connection 14. The computer-to-computer connection 14 may be a LAN or the Internet for example.

The operating program 10 is preferably automatically called up and launched when the control unit 6 is powered up. Alternatively, however, it may also be called up manually by a user 15. When the operating program 10 is called up, by executing the operating program the control device 6 executes an operating method which will be described in greater detail below with reference to FIG. 2.

According to FIG. 2, the control unit 6 first calls up the control file 11 in a step S1. If a plurality of control files 11 are stored in the mass storage means 9, a selection may of course first be made by the user 15.

According to FIG. 3, the control file 11 comprises a sequence of control vectors 16. Each control vector 16 has a number of vector elements 17 here. Each vector element 17 is determined for a maximum of one of the drives 2 to 5 of the machine tool 1. Conversely, each control vector 16 has at least one vector element 17 for each drive 2 to 5 of the machine tool 1. Only for the better understanding of the present invention is it also indicated here in FIG. 3 in brackets at the beginning of each vector element 17 for which of the drives 2 to 5 the respective vector element 17 is determined.

According to FIG. 3, for example, the first two vector elements 17 of each control vector 16 are determined for the final drive 2. The first of said vector elements 17 represents a positioning setpoint value s* for said drive 2. The positioning setpoint value s* is here preferably a position setpoint s* for said final drive 2. Alternatively, however, a setpoint I*, U* underlying the position setpoint s* could also be specified, for example a current setpoint I* or a voltage setpoint U* as shown in brackets in FIG. 3. Specification of a speed setpoint is also possible.

In addition to said positioning setpoint value s*, according to FIG. 3 a further vector element 17 is present for said drive 2, which element contains a supplementary value e for the positioning setpoint value s*. The supplementary value e may be a time derivation of the positioning setpoint value s* for example. If a position setpoint s* is specified, therefore, a speed setpoint, an acceleration setpoint or a jerk setpoint can be specified, for example.

By virtue of the above-mentioned vector elements 17 determined for the final drive 2, the control unit 6 is able to determine on the basis of said vector elements 17 the control state of the final drive 2 at every instant. Only the corresponding vector elements 17 of the control vector 16 to be currently executed are preferably used here. If necessary, however, the corresponding vector elements 17 of the control vector 16 executed immediately beforehand and/or immediately afterwards can also be used.

Corresponding vector elements 17 are also present for the other final drives 3, 4 analogously. Here, too, the control unit 6 is able to determine for every instant on the basis of the vector elements 17 determined for the respective drive 3, 4 the control state of said drive.

As already mentioned, the drive 5 is not a final drive. The vector element 17 determined for said drive 5 therefore does not correspond to a positioning setpoint value, but rather determines at least one ON/OFF state of the drive 5. For instance, the respective vector element 17 can comprise a setpoint n* for a continuously variable value n, e.g. a speed setpoint n*, for said drive 5. Also with respect to said drive 5, the control unit 6 is however able to determine for every instant the control state of said drive 5 on the basis of the vector elements 17 determined for said drive.

As a rule, the control unit 6 determines the control states of the drives 2 to 5 solely on the basis of the vector elements 17 assigned to the respective drive 2 to 5. It is however also possible for the control unit 6 to additionally factor in correction values δ2 to δ5 additively or multiplicatively. As a result, in particular it is possible to compensate for slight alignment errors and/or any tool wear locally, without having to newly determine the sequence of control vectors 16.

If necessary the control vectors 16 can further contain additional vector elements 17 which are determined for components other than the drives 2 to 5. This is of secondary importance in relation to the present invention, but can likewise be taken into account. This will be discussed in greater detail below.

As can be seen from FIG. 2, the control unit 6 executes a loop comprising the steps S2 to S5. In step S2, the control unit 6 calls up the first control vector 16 of the sequence of control vectors 16 and executes it. It thus determines the control state for each drive 2 to 5 on the basis of the vector elements 17 of said control vector 16 determined for the respective drive 2 to 5, and controls each of the drives 2 to 5 accordingly. In step S3 the control unit 6 checks whether it has fully executed the sequence of control vectors 16. If it has not yet fully executed the sequence of control vectors 16, in step S4 it executes the next control vector 16 of the sequence of control vectors 16. From step S4 it goes back to step S3 again.

Owing to the structure of the control vectors 16, a clock interval δt is required to execute each control vector 16. The clock interval δt is here equal to a predetermined minimum value δt', as long as the user 15 makes no corrective inputs. In this case, which represents the normal operation, the control unit 6—see FIG. 3—therefore staggers the execution of directly successive control vectors 16 by the predetermined minimum value δt'.

If, on the other hand, the user 15 interactively inputs a so-called override signal, this leads to a temporary increase in the clock interval δt. The sequence of control vectors 16 is therefore executed more slowly. In the case of a complete override, the execution of the control vectors 16 is not continued. As a result, therefore, the user 15 is even able to set the clock interval δt to infinite.

If the control unit 6 determined in step S3 that the sequence of control vectors 16 has been fully executed, in step S5 it checks whether execution of the control file 11 should be terminated. If so, the operating method has been completed. If not, the control unit 6 goes back to step S2 and continues executing the control file 11 with the first control vector 16 of the control file 11. In this case, therefore, the sequence of control vectors 16 stored in the control file 11 is executed cyclically.

Whether a single or cyclical execution of the sequence of control vectors 16 is performed may depend on various variables. For instance, the machine tool 1 may be working in continuous operation. In this case the sequence of control vectors 16 is executed cyclically. Alternatively, the machine tool 1 can also work in test mode or, for example, in single-part production or small batch production. In this case the sequence of control vectors 16 is executed only once. In addition, it should also be mentioned that execution of the sequence of control vectors 16 can be interrupted at any time, for example if a stop signal or an emergency shutdown signal is issued by the user 15 or in some other manner.

In contrast to conventional controllers for machine tools, therefore, the control unit 6 of the present invention no longer determines the control vectors 16 on the basis of functional instructions and then executes them with a close temporal link to their determination. Rather it now only executes the specified sequence of control vectors 16, with strict clocking. As a consequence, the control unit 6 according to the invention need no longer contain any intelligence for processing such functional instructions. Rather, it is sufficient for it to be operable solely in accordance with the operating method described above.

It is possible for a computer to be permanently assigned to the control unit 6, which computer determines the sequence of control vectors 16 on the basis of the functional instructions. In this case, too, the sequence of control vectors 16 is however determined completely in advance and is made available to the control unit 6 as a control file 11. As a result, the determination of the sequence of control vectors 16 is also fully decoupled from its execution in this case. The computer is however preferably different from the control unit 6.

Figure 4:
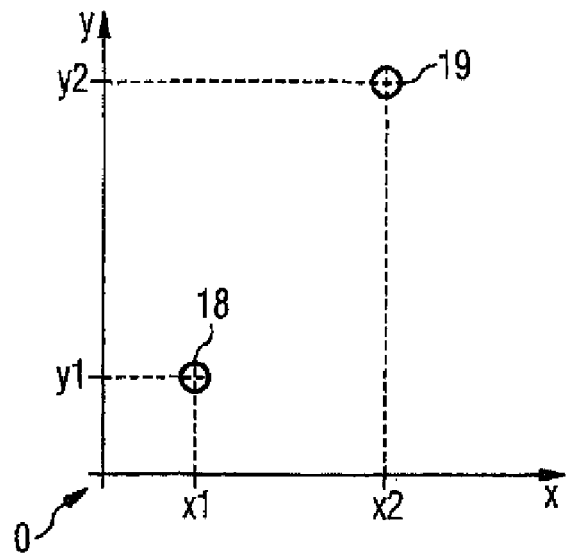
FIGS. 4 to 6 diagrammatically show desired machining operations.
Figure 5:
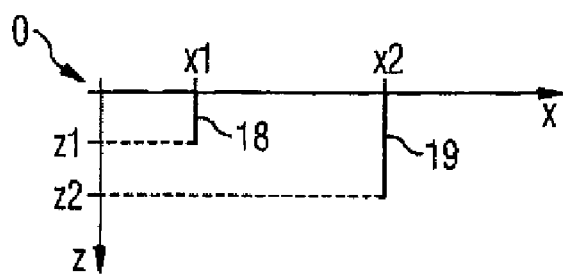

The above, generally described procedure will be discussed again below in conjunction with FIGS. 4 and 5 with reference to a simple example.

Let us assume, for example, that tool 7 is initially at the coordinates origin 0 and two drill holes 18, 19 are to be drilled. Let the first hole 18 have coordinates x1 y1 of x1=10 and y1=10 in the xy plane Let the drilling depth z1 for the first drill hole 18 be 5, a desired drill speed n 300 revolutions/min.

The second drill hole 19 is to lie on the xy plane at coordinates x2=30 and y2=40. Let the drilling depth z2 for said second drill hole 19 be 10, the drill speed n 200 revolutions/min. This machining operation could be described in functional instructions as follows for example:

(ON/300)
(10/10/0/vmax)
(10/10/5/v1)
(10/10/0/v1)
(ON/200)
(30/40/0/vmax)
(30/40/10/v1)
(30/40/0/v1)
(OFF)
(0/0/0/vmax).

With the first command the drive 5 for the drill chuck 7 is switched on and a setpoint speed n* of 300 revolutions/min is specified. With the second command, the drill chuck 7 is moved at maximum speed vmax to the position of the first drill hole 18. With the third command, the drill hole 18 is drilled with the required drilling depth z1. The feed is performed here with a working speed v1.

With the fourth command the drill bit 7' is removed from the drill hole 18 again. The fifth command reduces the setpoint speed n* to 200 revolutions/min. With the sixth command, the drill bit 7' is moved at maximum speed vmax to the position of the second drill hole 19. With the next two steps, the drill hole 19 is drilled and the drill bit 7' is withdrawn, both at working speed v1. With the penultimate command, the drive 5 for the drill bit 7' is switched off. With the last command the drill bit 7' is moved back to the coordinates origin 0 again. This traversing movement is performed at maximum traversing speed vmax.

It can already be immediately and readily seen from this exemplary simple sequence of commands that not every instruction for every drive 2 to 5 of the machine tool 1 contains elements. Above all, however, it can also be seen that the times for executing the individual instructions cannot be the same. For instance, the second, the sixth and the tenth (=last) instruction define in each case traversing movements comprising different distances, but all are to be executed at the maximum traversing speed vmax. Analogously, the execution of instructions 3 and 4 logically requires less time than the execution of instructions 7 and 8. When specifying functional instruction steps, in principle it is therefore not possible to guarantee that all functional instructions will be executed with the same clock interval δt. In the prior art, a numerical controller rather determines a sequence of corresponding control vectors 16 on the basis of the functional instructions. The control vectors 16 for example from the coordinates origin to the first drill hole 18 and for drilling the first drill hole 18 could be as follows for example:

(0/amax/0/amax/0/0/300/V/N)
(0.25/amax/0.25/amax/0/0/300/V/N)
(1/0/1/0/0/0/300/V/N)
(2/0/2/0/0/0/300/V/N)
.
.
.
(8/0/8/0/0/0/300/V/N)
(9/−amax/9/−amax/0/0/300/V/N)
(9.75/−amax/9.75/−amax/0/0/300/V/N)

-continued (10/0/10/0/0/a1/300/V/N)
(10/0/10/0/0.125/a1/300/V/N)
(10/0/10/0/0.5/0/300/V/N)
.
.
.
(10/0/10/0/4.5/−a1/300/V/N)
(10/0/10/0/4.875/−a1/300/V/N)
(10/0/10/0/5/−a1/300/V/N)
(10/0/10/0/4.875/−a1/300/V/N)
(10/0/10/0/4.5/0/300/V/N)
.
.
.

The first, third and fifth vector element 17 of each control vector 16 specifies here the current setpoint coordinates for the respective final drive 2 to 4, while the second, fourth and sixth coordinates specify the current acceleration. The seventh vector element 17 defines in each case the setpoint speed $n^*$ of the drive 5 and consequently also implicitly whether the drive 5 is switched on or off.

The penultimate vector element 17 is in turn itself a setpoint state vector V for sensor elements 19' of the machine 1. It is therefore possible for the control unit 6 to detect via the sensor elements 19' actual states i of the machine 1 and compare them with the respective target state vector V of the respective control vector 16. The actual control vector 16, that is to say the vector elements 17 of said control vector 16 with the exception of the target state vector V, is only executed by the control unit 6 if the detected actual states i correspond to the target state vector V.

By virtue of the assignment of the target state vectors V to the control vectors 16, therefore, the target state vectors V are also parts of the control file 11.

The last vector element 17 is an emergency stop delay N. It may be the same for all control vectors 16. It may however also be specific to the respective control vector 16. It indicates how fast the machine I will be brought to a standstill in the event of an emergency stop request. Given appropriate specification of the emergency stop delay N, the control unit 6 is therefore able to maintain a coordination of the final drives 2 to 4 defined by the sequence of control vectors 16 even if the emergency stop request is issued to it. It can therefore control the final drives 2 to 4 accordingly in this case too. The emergency stop request can be issued to the control unit 6 here either by the user 15 or by means of the control file 11, namely when the actual states i and target state vector V do not match.

Figure 6:
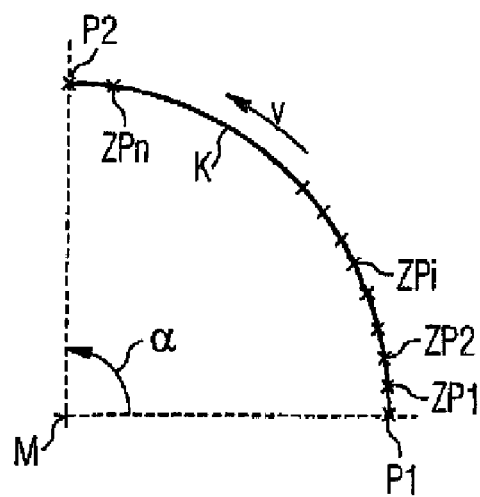

The difference between the procedure according to the invention and that of the prior art becomes even more clear if functional instructions for a non-linear curve are specified, for example for a quarter arc as shown in FIG. 6.

According to FIG. 6, P1 is a start point of the quarter circle on the xy plane, P2 is an end point. The quarter circle is to be traveled at a specified speed v. A functional instruction for this could for example be:

(K, M, P1, α, v)

K indicates here that a circle is to be traveled. M defines the center point of the circle K, P1 the start point on the circle K, and consequently implicitly its radius. α indicates the angle of travel. v is the desired traversing speed.

It can be readily and immediately seen that the time required for executing said functional instruction depends on the parameters of the functional instruction, to be precise on the radius defined by the points M and P1, the angle α to be covered, and the desired traversing speed v.

The corresponding control vectors 16 of the respective control file 11 now define the coordinates of all intermediate positions ZP1, . . . , ZPn and the corresponding accelerations. The next intermediate point ZPi is approached here with each cycle of the clock interval δt. The corresponding control vectors 16 are therefore, for example, (P1x/a0x/P1y/a0y)
(ZP1x/a1x/ZP1y/a1y)
(ZP2x/a2x/ZP2y/a2y)
.
.
.
(ZPnx/anx/Zpny/any)
(P2x/0/P2y/0).

For the sake of clarity, only vector elements 17 for the final drives 2 and 3 have been listed above in this case. The remaining vector elements 17 were omitted.

The sequence of control vectors 16 must of course have been generated correctly. According to FIG. 7, a computer 20 is provided for this purpose. Here the computer 20 is not designed as a control unit by means of which the machine tool 1 can be controlled. It may be, for example, a commercially available non real-time PC or a non real-time workstation. As already mentioned, it could however also be permanently assigned to the control unit 6, in particular be a part of the control unit 6.

The computer 20 also has, inter alia, a mass storage means 21, e.g. a hard disk 21. A generation program 22 is stored in the mass storage means 21. As indicated by dashed lines in FIG. 7, in this case the generation program 22 can have been previously supplied to the computer 20 via a data carrier 23 on which the generation program 22 is stored in (exclusively) machine-readable form. One example of such a data carrier 23 is again a CD-ROM 23. The generation program 22 can however also have been supplied to the computer 20 in a different manner, for example again via the computer-to-computer connection 14.

The generation program 22 can be called up by means of a call command issued to the computer 20. The call command can be issued to the computer 20 by a user 15' for example. The user 15' may be different from the user 15 of the machine tool 1. An indirect call is however also possible via the computer-to-computer connection 14, in particular from the control unit 6 or from another (not illustrated) computer.

When the generation program 22 is called up, by executing the generation program 22 the computer 20 executes a generation method for the control file 11, which will be described in greater detail below with reference to FIG. 8. The control file 11 is here the same control file 11 that was described above in connection with the machine tool 1 and its control unit 6. If a plurality of generation programs 22 are stored in the mass storage means 21, the call command further naturally corresponds to a selection command, on the basis of which the computer 20 determines which of the generation programs 22 it executes.

According to FIG. 8, a machining to be realized by the machine tool 1 is first specified for the computer 20 in functional instructions in a step S6. The functional instructions can be specified for the computer 20, as indicated schematically in FIG. 7, in the form of an application program 24 with individual instruction steps 25 for example, or in the form of a CAM file 26.

In order to be able to correctly generate the sequence of control vectors 16, and consequently the control file 11, a complete description of the machine tool 1 and of the control unit 6 must of course be known to the computer 20. For instance machine parameters MP of the machine tool 1 must be known to the computer 20. The machine parameters MP may comprise, for example, which axes are present, which axis is controlled by which of the drives 2 to 5, the dynamics of the final drives 2 to 4, and which—possibly load-dependent and/or state-dependent—elasticities the axes and the final drives 2 to 4 possess. If necessary, it is even possible to take account of position-dependent natural oscillations or gravity-related bending and the like as part of the modeling.

To model the machine tool 1, a model 27 of the machine tool 1 is implemented in the computer 20, which model describes the machine tool 1 completely with said machine parameters MP. The model 27 may be unalterable here, that is to say specifically designed for the machine tool 1 to be modeled. The model 27 is however preferably parameterizable. In this case, the machine parameters MP are specified for the computer 20 in a step S7. In this case the computer 20 parameterizes the model 27 in accordance with the specified machine parameters MP in a step S8.

On the basis of the functional instructions, for example of the application program 24 and of the model 27 of the machine tool 1 including its control unit 6, the computer 20 then determines in a step S9 the desired sequence of control vectors 16 including the target state vectors V for the sensor elements 19'. It stores said sequence of control vectors 16 as a control file 11 in a step S10. The computer 20 thus assigns the target state vectors V to the actual control vectors 16 and stores them together with the actual control vectors 16 in the control file 11.

At the same time the computer 20 also preferably determines an expected machining result 28 on the basis of the sequence of control vectors 16. For instance, the computer 20 can determine and store a result file 28 which contains a data record containing a description of a machined workpiece. Details of generating such a result file may be found in the earlier German Patent Application 10340403.1 of the Applicant, not yet published on the filing date of the present invention. The information disclosed in said application is hereby included by reference in the present application.

It is possible for the computer 20 simply to determine and store the expected result 28. Preferably, however, the computer 20 is also supplied with a target machining result 28', e.g. a CAD file 28' of the workpiece. In this case, the computer 20 is then able to compare the expected result 28 with the target result 28' and, on the basis of the comparison, optimize the sequence of control vectors 16—also iteratively if necessary. For instance, the computer 20 can set the dynamics of the control vectors 16 in such a way that specified tolerances are just maintained. The computer 20 may perform the optimization here either autonomously or under user control.

As already mentioned, the control file 11 and the control vectors 16 contained in the control file 11 correspond in form and content to the control file 11 and to the control vectors 16 that were described above in connection with FIGS. 1 to 6. Each vector element 16 thus has a number of vector elements 17, with each vector element 17 being determined for a maximum of one of the drives 2 to 5 of the machine tool 1. Each control vector 16 has here at least one vector element 17 for each drive 2 to 5 of the machine tool 1. The control unit 6 of the machine tool 1 is to stagger the execution of directly successive control vectors 16 by a specified minimum clock interval δt'.

For each instant, the control state of each drive 2 to 5 of the machine tool 1 can be determined by the control unit 6 on the basis of the vector elements 17 determined for said drive 2 to 5. The contents of the individual vector elements 17 also correspond to the contents described above in connection with FIGS. 1 to 6. In particular, the control file 11 thus also includes the emergency stop delay N determined by the computer 20.

In principle, both the specification of the functional instructions as well as the specification of the machine parameters MP may be carried out in any desired way. For instance, in particular it is possible for said specifications and also other specifications to be sent to the computer 20 via the computer-to-computer connection 14. Likewise, the stored files 11, 28 may be output by the computer 20 in any way. In particular, output is again possible here via the computer-to-computer connection 14.

As a rule the computer 20 does not directly control the drives 2 to 5 of the machine tool 1. It is therefore not usually designed as the control unit 6 controlling the machine tool 1. It is therefore not necessary for the computer 20 to determine the sequence of control vectors 16 with a close temporal link to their execution.

As already mentioned, the control unit 6 is preferably operable solely in accordance with the operating method described above in connection with FIGS. 1 to 6. It therefore only functions correctly when it is supplied with the control file 11 according to the invention. Said operation corresponds to a base mode of the control unit 6. However, the control unit 6 is not able to determine the required control vectors 16 itself on the basis of the functional instructions.

In order to enable manual control of the machine tool 1, a so-called jogging mode, despite this design of the control unit 6, the control file 11 is not executed using an additional mode of the control unit 6. Instead, the procedure of FIG. 9 is carried out, as follows:

Pursuant to FIG. 9, a connection is first established between the computer 20 and the control unit 6, e.g. the computer-to-computer connection 14 in step S11. A key of an input device of the control unit 6 is then actuated. This actuation of the key corresponds to a change instruction for changing the current state of the machine tool 1. It is detected by the control unit 6 in step S12.

The control unit 6 transmits said change instruction in a step S13 together with a full description of the current state of the machine tool 1 to the computer 20. It then waits in a step S14 until the computer 20 transmits a further control file 11' to it. It receives said further control file 11' in a step S15. In a step S16 it executes the sequence of control vectors 16 contained in the further control file 11' once. In individual cases, the further control file 11' contains only a single control vector 16 here. As a rule, however, like the control file 11 it also contains a plurality of control vectors 16. It then checks in a step S17 whether jogging mode is to be terminated. If so, it exits the jogging mode, otherwise it returns to step S12.

There is no significant change with respect to the computer 20. The only difference from the previously described procedure is that a description of a current machine state and change instruction are specified as functional instructions for the computer 20. Nevertheless, the computer 20 is able to determine the control vector(s) 16 because the machine tool 1 is known to it as such on the basis of the model 27.

In this case the computer 20 naturally additionally transmits the further control file 11' to the control unit 6, as soon as it has been generated by it. Even in jogging mode (and in normal operation anyway) the computer 20 does not however control the machine tool 1.

By virtue of this modification it is therefore also possible to realize a jogging mode, as is required for example during setup or during troubleshooting.

The advantage of the present invention is therefore essentially that the sequence of control vectors 16 need now only be determined in advance by the computer 20 and consequently decoupled from their execution. Moreover, given parallel use on a plurality of identical machine tools 1, it is also only necessary to generate the control file 11 once. Furthermore, the clock interval δt is not dependent on the computing performance of the computer 20, but rather is only dependent on the performance of the control unit 6 when executing the sequence of control vectors 16.

It is also possible to update the generation program 22 centrally, which corresponds to the control kernel of a prior art numerical controller, and then generate a new control file 11, without having to make changes locally to the operating program 10 of the control unit 6. It is then only necessary to generate an updated control file 11 with the new generation program 22 and make it accessible to the control unit 6. In turn, the control unit 6 need now only be able to operate the individual drives 2 to 5 in a coordinated manner. The position control can even be omitted if setpoints I*, U* underlying position setpoints s* are specified.

What is claimed is:

1. A method for generating a control file for a control unit of a machine having at least one final drive unit, said method comprising the steps of:
   supplying functional instructions to a computer, said functional instructions specifying a machining process to be performed by the machine;
   executing a generation program, said generation program causing the computer to determine a sequence of control vectors using the functional instructions, each control vector having a plurality of vector elements, each vector element being determined for a maximum of one final drive unit of the machine, each control vector having at least one vector element for each final drive unit of the machine, vector elements determined for a final drive unit including at least one positioning setpoint value; and
   executing the sequence of control vectors, execution of directly successive control vectors in the sequence being staggered by a predetermined minimum clock interval so that a control state of each final drive unit of the machine can be determined by the control unit for each respective instant using at least one respective vector element determined for the final drive unit, so that the computer does not determine control vectors while executing the sequence of control vectors.

2. The method of claim 1, further comprising the step of storing a determined sequence of control vectors in a control file.

3. The method of claim 1, wherein the step of determining a sequence of control vectors is decoupled from the step of executing the sequence of control vectors.

4. The method of claim 3 wherein the functional instructions are specified as a description of a current machine state and a change instruction, said method further comprising the step of storing only one control vector in a control file.

5. The method of claim 1, wherein the functional instructions are specified as an application program having instruction steps.

6. The method of claim 5, wherein the functional instructions are specified as a CAM file.

7. The method of claim 1, further comprising the steps of specifying machine parameters for use by the computer; and parameterizing the parameterizable model using the specified parameters, the sequence of control vectors being determined by the computer using the parameterizable model.

8. The method of claim 7 wherein the specifying step uses a computer-to-computer connection.

9. The method of claim 7, further comprising the step of supplying the control file to the control unit via the Internet.

10. The method of claim 7, further comprising the step of supplying the control file to the control unit via a LAN.

11. The method of claim 7, further comprising the step of supplying the control file to the control unit via a data carrier.

12. The method of claim 1, further comprising the steps of specifying a selection command for the computer; and determining which of a plurality of generation programs is executed using the specified selection command.

13. The method of claim 1, further comprising the steps of determining an expected machining result using the sequence of control vectors; and storing the determined result as a result file.

14. The method of claim 13, wherein the stored determined result is a data record describing a machined workpiece.

15. The method of claim 13, further comprising the steps of supplying the computer with a target machining result; comparing the expected result with the target result; and optimizing the sequence of control vectors using the comparison of the expected result with the target result.

16. The method of claim 1, wherein the vector elements determined for the final drive unit also include at least one supplementary value.

17. The method of claim 1, wherein the vector elements determined for the final drive unit also include at least one time derivative of the positioning setpoint value.

18. The method of claim 1, wherein the control vectors determined include a vector element for at least one further drive unit of the machine that is not a final drive unit, said vector element determining at least an ON/OFF state of said further drive unit.

19. The method of claim 1, wherein the control vectors determined include a vector element for at least one further drive unit of the machine that is not a final drive unit, said vector element including a setpoint value for a continuously variable value.

20. The method of claim 1, wherein the control vectors determined include a vector element for at least one further drive unit of the machine that is not a final drive unit, said vector element including a speed setpoint value.

21. The method of claim 1, wherein the machine has at least two final drive units, and further comprising the steps of determining an emergency stop delay; and storing the emergency stop delay in a control file.

22. The method of claim 1, wherein the emergency stop delay is a control vector-dependent emergency stop delay.

23. The method of claim 1, further comprising the steps of determining a target state vector for a sensor element of the machine together with a control vector determined by the computer; assigning the target state vector to a control vector; and storing the target state vector in a control file together with a control vector.

24. A data carrier for use in generating control vectors for controlling a machine having a control unit and at least one final drive unit, said data carrier comprising:
   computer program means for determining a sequence of control vectors using functional instructions, each control vector having a plurality of vector elements; and
   computer program means for determining at least one vector element for each final drive unit of the machine in each control vector, each vector element being determined for a maximum of one final drive unit of the machine, vector elements determined for a final drive unit including at least one positioning setpoint value, said sequence of control vectors generated by said generation program being adapted to cooperate with an operating program whereby execution of directly successive control vectors in said sequence of control vectors is staggered by a predetermined minimum clock interval so that a control state of a final drive unit of the machine in a respective instant can be determined by the control unit using at least one respective vector element determined for said final drive unit, so that the operating program does not execute the sequence of control vectors when said generation program determines control vectors.

25. A computer for generating control vectors for use by a control unit of a machine having a control unit and at least one final drive unit, said computer comprising:

mass storage having computer program means for determining a sequence of control vectors using functional instructions, each control vector having a plurality of vector elements, and for determining at least one vector element for each final drive unit of the machine in each control vector, each vector element being determined for a maximum of one final drive unit of the machine, vector elements determined for a final drive unit including at least one positioning setpoint value, said sequence of control vectors generated by said generation program being adapted to cooperate with an operating program whereby execution of directly successive control vectors in said sequence of control vectors is staggered by a predetermined minimum clock interval so that a control state of a final drive unit of the machine in a respective instant can be determined by the control unit using at least one respective vector element determined for the final drive unit; and computer program execution means adapted to execute said computer program means for determining said sequence of control vectors and said at least one vector element when said computer program means is called, and does not execute the sequence of control vectors when determining control vectors.

26. The computer of claim 25, wherein the computer is not designed as the control unit for controlling the machine.

27. A data carrier for use by a control unit of a machine having at least one final drive unit, said data carrier comprising:

at least one control file having at least one sequence of control vectors; and a plurality of vector elements in each control vector, each vector element being determined for a maximum of one final drive unit of the machine, each control vector having at least one vector element for each final drive unit of the machine, vector elements for a final drive unit including at least one positioning setpoint value, said sequence of control vectors being adapted to cooperate with an operating program whereby execution of directly successive control vectors in said sequence of control vectors is staggered by a predetermined minimum clock interval so that a control state of a final drive unit of the machine in a respective instant can be determined by the control unit using at least one respective vector element determined for the final drive unit, wherein the operating program does execute the sequence of control vectors when determining control vectors.

28. A method for operating a control unit of a machine having at least one final drive unit, said method comprising the steps of:

calling a control file, said control file including at least one sequence of control vectors; and executing said at least one sequence of control vectors, each control vector having a plurality of vector elements, each vector element being determined for a maximum of one final drive unit, each control vector having at least one vector element for each final drive unit, each vector for a final drive unit including at least one positioning setpoint value, execution of directly successive control vectors in the sequence of control vectors by the control unit being staggered by a specified clock interval so that a control state of a final drive unit of the machine can be determined by the control unit for a respective instant using at least one respective vector element determined for the final drive unit, so that control unit does not determine control vectors when executing the sequence of control vectors.

29. The method of claim 28, further comprising the steps of determining the control state of a final drive unit of the machine for each instant using the vector elements for the final drive unit; and controlling the final drive unit in response to the determined control state of the final drive unit.

30. The method of claim 28, wherein vector elements determined for the final drive unit include at least one supplementary value.

31. The method of claim 28, wherein vector elements determined for the final drive unit include at least one time derivation of the positioning setpoint value.

32. The method of claim 28, wherein the control vectors determined include a vector element for at least one further drive unit of the machine that is not a final drive unit, said vector element determining at least an ON/OFF state of said further drive unit.

33. The method of claim 28, wherein the control vectors determined include a vector element for at least one further drive unit of the machine that is not a final drive unit, said vector element including a setpoint value for a continuously variable value.

34. The method of claim 28, wherein the control vectors determined include a vector element for at least one further drive unit of the machine that is not a final drive unit, said vector element including a speed setpoint value.

35. The method of claim 28, wherein the machine has at least two final drive units and the control file includes an emergency stop delay, further comprising the step of executing the emergency stop delay.

36. The method of claim 28, wherein the machine has at least two final drive units and the control file includes a control vector-dependent emergency stop delay, further comprising the step of executing the control vector-dependent emergency stop delay.

37. The method of claim 28, wherein the control unit has a base mode and an additional mode, and the sequence of control vectors stored in a control file is only executed in the base mode of the control unit, in the additional mode said method further comprising the steps of supplying a description of a current machine state and a change instruction to a computer; said control unit waiting until a further control file is supplied to the control unit by the computer after the description and change instruction are supplied to the computer; and after a further control file is supplied to the control unit by the computer, executing the sequence of control vectors contained in the further control file once.

38. The method of claim 28, further comprising the step of interactively specifying the clock interval.

39. The method of claim 38 wherein the clock interval is interactively specified as infinite.

40. The method of claim 28, further comprising the steps of detecting an actual state of the machine using sensor elements; and determining whether the detected actual state of the machine corresponds to a respective target state vector determined for a respective control vector, the control unit only executing the respective control vector if the detected actual state of the machine corresponds to the respective target state vector assigned to the respective control vector.

41. The method of claim 40, wherein the target state vector is included in a control file.

42. The method of claim 28, further comprising the steps of specifying an emergency stop delay for the machine; and controlling the final drive units in the event of an emergency stop request in such a way that a coordination of the final drive units defined by the sequence of control vectors is maintained by the control unit.

43. The method of claim 28, further comprising the step of correcting vector elements used to determine the control state of a final drive unit by an additive factoring of a correction value.

44. The method of claim 28, further comprising the step of correcting vector elements used to determine the control state of a final drive unit by a multiplicative factoring of a correction value.

45. A data carrier for use by a control unit for operating a machine having at least one final drive unit, said data carrier comprising:
program means for calling a control file, said control file including at least one sequence of control vectors; and
at least one control unit program for executing said at least one sequence of control vectors in the control file, each control vector having a plurality of vector elements, each vector element being determined for a maximum of one final drive unit, each control vector having at least one vector element for each final drive unit, each vector for a final drive unit including at least one positioning setpoint value, execution by the control unit of directly successive control vectors in the sequence of control vectors being staggered by a specified clock interval so that the control state of a final drive unit of the machine can be determined by the control unit for a respective instant using at least one respective vector element determined for said final drive unit, so that the control unit does not determine control vectors when executing a sequence of control vectors.

46. A control unit for controlling a machine having at least one final drive unit, said control unit comprising:

a mass storage device having an operating program stored in said mass storage device, said operating program being adapted to call a control file, said control file including at least one sequence of control vectors, and means for executing said at least one sequence of control vectors, each control vector having a plurality of vector elements, each vector element being determined for a maximum of one final drive unit, each control vector having at least one vector element for each final drive unit, each vector for a final drive unit including at least one positioning setpoint value, execution of directly successive control vectors in said sequence of control vectors by the control unit being staggered by a specified clock interval so that a control state of a final drive unit of the machine can be determined by the control unit for a respective instant using at least one vector element determined for said final drive unit; and means for executing said operating program when said operating program is called, so that the control unit does not determine control vectors when executing the sequence of control vectors.

47. The control unit of claim 46, wherein the machine is operable by the control unit solely in accordance with said operating program.

48. A machine, comprising:
at least one final drive unit;
a mass storage device having an operating program stored in said mass storage device, said operating program being adapted to call a control file, said control file including at least one sequence of control vectors, and means for executing said at least one sequence of control vectors, each control vector having a plurality of vector elements, each vector element being determined for a maximum of one final drive unit, each control vector having at least one vector element for each final drive unit, each vector for a final drive unit including at least one positioning setpoint value, execution of directly successive control vectors in said sequence of control vectors by the control unit being staggered by a specified clock interval so that a control state of a final drive unit of the machine can be determined by the control unit for a respective instant using at least one vector element determined for said final drive unit; and means for executing said operating program, when said operating program is called, so that the operating program does not determine control vectors when executing the sequence of control vectors.

* * * * *

UNITED STATES PATENT AND TRADEMARK OFFICE
CERTIFICATE OF CORRECTION

PATENT NO. : 7,570,006 B2  
APPLICATION NO. : 11/569013  
DATED : August 4, 2009  
INVENTOR(S) : Jochen Bretschneider Page 1 of 1

It is certified that error appears in the above-identified patent and that said Letters Patent is hereby corrected as shown below:

Column 14, claim 22, line 48: replace "1" with the correct --21--.

Signed and Sealed this

Twenty-second Day of September, 2009

David J. Kappos  
*Director of the United States Patent and Trademark Office*